United States Patent Office 3,200,515
Patented Aug. 17, 1965

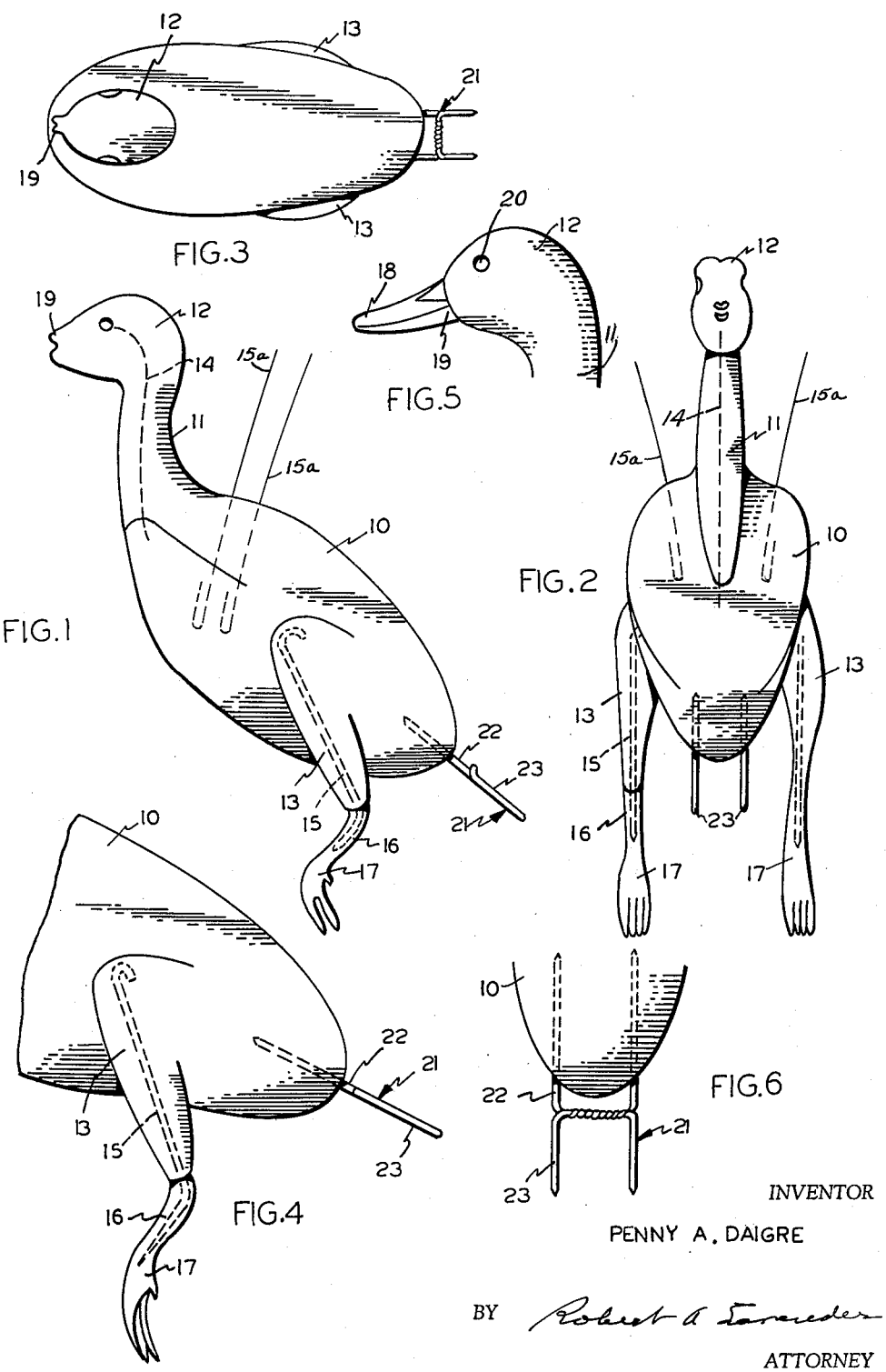

3,200,515
TAXIDERMY
Penny A. Daigre, Box 8596, Louisiana State University,
Baton Rouge, La.
Filed May 29, 1962, Ser. No. 198,617
2 Claims. (Cl. 35—20)

The present invention relates to the art of taxidermy and particularly to a new body form of a prefabricated, life-size bird or other animal body form complete with head, neck, legs, artificial eyes and feet, wing wires, tail support, body support and panel or base.

The art of taxidermy is an old established art and for many years was nothing more than an embalming, stuffing and upholstering process. The fine art of mounting mammal skins over realistically sculptured hollow forms is only a little more than fifty years old. One of the earliest methods employed included mounting a skin over a cast replica of a clay model. Subsequent methods involved the use of wood, wool or excelsior as the body forming material, or the use of balsa wood or the like which can be hand carved. In all prior art constructions involving the use of forms, it was customary to cast or build the form in the shape of the body only.

The present invention will be disclosed in one embodiment in which contemplates the provision of a light weight plastic bird body with head, neck and legs included, and in some cases the beak and feet are also included. The present invention involves the provision of a Mount It Yourself Kit which includes the aforementioned parts with some of the parts so shaped as to provide the final mounted bird in a particular posed position. For example, if a person desires to mount a Mallard Duck in a landing position, he would buy a kit for this purpose. The angle of the bill, the position of the head, the neck and the feet would be in accurate positions for the over-all posture desired. This would apply also to birds in flight or in take-off position and would make realism possible in a simplified manner.

A further aspect of the present invention is the use of expandable polystyrene beads in the molding of bird bodies and the use of any of the light weight foam plastics such as polyurethane for this purpose. The invention also embodies the use of latex molding compounds such as neoprene, styrene or butadiene suitably colored for the making of the artificial feet and beaks for all birds. The use of natural colored cast beaks and feet offer tremendous advantages toward realism and long life. The colors in the natural feet and bills of birds are embedded. When a specimen is mounted according to old methods where the natural feet and beaks are used, these natural colors fade and they must be restored with oil colors which always appear unnatural. Among other things, real feet shrink and exude oil which oxidizes oil paint. In the present use of embedded color in plastic feet and beaks, it is possible to obtain not only realism but long life.

Thus, the primary object of the present invention resides in the provision of a Do It Yourself Mounting Kit that includes a prefabricated life size plastic bird body complete with head, neck, legs, artificial feet, artificial eyes, wing wires, tail support, body support panel and full instructions in the use of the kit. The primary advantage of this kit is that anyone, even those without artistic skill or talent, can mount birds successfully.

A further object of the invention is to provide a form of the type described above wherein the parts may be so shaped as to produce the mounted bird in any one of a number of posed positions.

Advantages of the foregoing objects are numerous. This method saves hours of hard work. It eliminates the making of an artificial body and neck by home methods. It eliminates the cutting and sharpening of neck wires, leg wires, wing wires, the making of a tail support, a body support, a panel, the setting of the artificial eyes and the painting of the feet. It eliminates the cleaning of the skull and pulling tendons from the feet. It eliminates the problem of posing the bird naturally. It is time saving both to the skilled commercial taxidermist and the amateur home taxidermist.

A still further object of the present invention is to provide a form which may be easily and inexpensively manufactured and thus made readily available to museums, educational institutions, commercial taxidermists, wildlife enthusiasts and sportsmen desiring to mount their own trophies.

With these and other objects in view, my invention includes the novel device and method described below and illustrated in the accompanying drawing in which:

FIGURE 1 is a side view of a body form illustrating the present invention.

FIGURE 2 is a front view of the form shown in FIGURE 1.

FIGURE 3 is a top view of the form shown in FIGURE 1.

FIGURE 4 is an enlarged detail view of one of the feet.

FIGURE 5 is an enlarged detail view of the bill mounting.

FIGURE 6 is an enlarged detail view of the tail support.

Referring to the drawing in detail, the present invention is embodied in the representation of a form to be used in mounting Mallard Ducks. The form body is indicated by the numeral 10 and includes as an integral part thereof the neck 11, the head 12 and the legs 13. The body is preferably molded of one piece of expandable polystyrene beads although any of the light weight foam plastics such as polyurethane could be used. Numeral 14 indicates a reinforcing wire in the neck portion for added strength. Also molded into the legs are wires 15 having a portion 16 extending from the legs for the installation of the feet 17. The feet are prefabricated and formed of latex molding compounds such as neoprene, styrene, or butadiene with suitable coloring material impregnated in the compound to simulate the natural color of the feet of the bird being mounted which in the present illustration comprises a Mallard Duck.

The beak or bill 18 is also prefabricated from latex molding compounds such as neoprene, styrene or butadiene and impregnated with suitable coloring material to resemble the bill of a Mallard Duck. The bill extrusion 18 is properly designed to interlock in mandible 19 projecting from the head 12 as shown in FIGURE 5. Eye sockets 20 are provided in the head 12 and are of such size as to receive 9 mm. glass eyes.

The tail support, indicated by numeral 21, comprises a pair of U-shaped wires 22 and 23, suitably twisted together as shown in FIGURE 6. The free ends of the legs of wire 22 are embedded in the body as illustrated with the free ends of wire 23 projecting from the body to receive the tail of the bird, not shown. Similarly, support 15a wires are provided for the wings of the bird.

As previously pointed out, the present form is designed for the mounting of a Mallard Duck. In accordance with instructions received in the kit, the skin of the Mallard Duck is placed on the form and properly sewn in place. It is at times impossible to pose the wings and tail of a bird in advance because these appendages are part of the skin, but to make the posing of these parts easy, the kit will include complete illustrated instructions with a colored photograph of the particular posture desired. All of the parts of the body that can be posed in advance of the final mounting are posed on the body in their proper relative positions. For example, if a purchaser desires to mount a Mallard Duck in a landing position, he would select or specify the type of kit containing a corresponding body form and body parts. The angle of the bill, the position of the head, the neck and the feeet would all be in their proper and accurate relative positions for this desired landing pose.

From the foregoing description, it will be readily apparent that the present invention is well adapted to accomplish the various objects and advantages set forth. It will be understood that minor changes may be made in the method and construction described without departing from the spirit of the invention except as may be required by the following claims.

Having thus described the invention, what is claimed is:

1. A prefabricated life-size form for mounting a particular bird in a particular predetermined life-like pose, comprising a unitary body portion having a head, a neck, and leg portions integrally united to said body portion, said head, neck and leg portions being rigid and being of such shape and having such positional relations to said body portion as to be in correct relative rigid position for mounting said bird in the predetermined pose, and mounting means extending into and out of said body portion at spaced points for supporting the wings, the tail, and the feet parts of the bird to be mounted, the outer end of said mounting means being adjustable in such directional relation to said body portion as to support the wings, the tail, and the feet of the bird in correct positional relation to the body portion for the predetermined pose of the bird.

2. A prefabricated life-size form for mounting a particular bird in a particular predetermined life-like pose, comprising a moulded rigid, one-piece body member of foamed plastic, said body member including a body portion, a head portion, and a neck portion, said body member having each of the aforementioned component portions being rigid and being of such predetermined shape and having such positional relations to said body portion as to be in correct relative rigid position for mounting said bird in the predetermined pose, and wire-like mounting means extending into and out of the body member at spaced points thereon for receiving and supporting the wings, the tail, and artificial feet parts of the bird to be mounted, the outer end of said mounting means being adjustable in such directional relation to said body portion as to support the wings, the tail, and the feet of the bird in correct positional relation to the body portion for the predetermined pose of the bird.

References Cited by the Examiner

UNITED STATES PATENTS

| | | | |
|---|---|---|---|
| 1,844,592 | 2/32 | Paladin | 35—20 |
| 2,134,974 | 11/38 | Hurwitz | 40—126 |
| 2,831,271 | 4/58 | Stitt | 35—20 |
| 3,066,501 | 12/62 | Charles et al. | 35—18 X |

EUGENE R. CAPOZIO, *Primary Examiner.*

LEO SMILOW, JEROME SCHNALL, *Examiners.*